US012556922B1

(12) United States Patent
Richards et al.

(10) Patent No.: US 12,556,922 B1
(45) Date of Patent: Feb. 17, 2026

(54) ROLE-BASED AUTHORIZATION FOR WIRELESS NETWORK MANAGEMENT SERVICES

(71) Applicant: Amazon Technologies, Inc., Seattle, WA (US)

(72) Inventors: Matthew James Richards, San Francisco, CA (US); Andrey Perminov, Dublin, CA (US); Ryan N. Thompson, Brooklyn, NY (US); Lucas Michael Cycon, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 342 days.

(21) Appl. No.: 18/367,983

(22) Filed: Sep. 13, 2023

(51) Int. Cl.
| | |
|---|---|
| *H04W 12/069* | (2021.01) |
| *H04W 12/02* | (2009.01) |
| *H04W 12/102* | (2021.01) |
| *H04W 76/12* | (2018.01) |
| *H04W 76/14* | (2018.01) |
| *H04W 84/18* | (2009.01) |

(52) U.S. Cl.
CPC ....... *H04W 12/069* (2021.01); *H04W 12/102* (2021.01); *H04W 76/12* (2018.02); *H04W 76/14* (2018.02); *H04W 84/18* (2013.01)

(58) Field of Classification Search
CPC .............................................. H04W 4/30–80
See application file for complete search history.

(56) References Cited

U.S. PATENT DOCUMENTS

| | | | |
|---|---|---|---|
| 10,693,638 B1* | 6/2020 | Cignetti | G06F 21/602 |
| 2007/0249324 A1* | 10/2007 | Jou | H04W 12/041 |
| | | | 455/411 |
| 2011/0099605 A1* | 4/2011 | Cha | H04L 63/20 |
| | | | 726/3 |
| 2011/0213965 A1* | 9/2011 | Fu | H04L 63/0823 |
| | | | 709/248 |
| 2018/0123804 A1* | 5/2018 | Smith | H04L 9/3213 |
| 2020/0084622 A1* | 3/2020 | Yoon | H04W 12/35 |
| 2020/0186365 A1* | 6/2020 | Kumar | H04L 9/3263 |
| 2022/0321362 A1* | 10/2022 | Konda | G06F 21/57 |

* cited by examiner

*Primary Examiner* — San Htun
(74) *Attorney, Agent, or Firm* — K&L Gates LLP

(57) ABSTRACT

Technology for mesh network management including role-based authorization for wireless network management services is described. In one embodiment, a wireless mesh device receives, from a requesting device, a request to establish a secure communication session, authenticates the client certificate and establishes the secure communication session. The wireless mesh device further receives, from the requesting device via the secure communication session, a request directed to a service of a plurality of services provided by the wireless mesh device, where the request comprises the client certificate associated with the requesting device, identifies a root certificate used to cryptographically sign the client certificate, wherein the root certificate is associated with a role assigned to the requesting device, identifies role information associated with the requesting device and the client certificate, and responsive to determining that the role information indicates that the requesting device has permission to access the service, forwards the request to the service.

20 Claims, 7 Drawing Sheets

ROLE-BASED AUTHORIZATION FOR WIRELESS NETWORK MANAGEMENT SERVICES

BACKGROUND

A large and growing population of users is enjoying entertainment through the consumption of digital media items, such as music, movies, images, electronic books, and so on. The users employ various electronic devices to consume such media items. Among these electronic devices (referred to herein as endpoint devices, user devices, clients, client devices, or user equipment) are electronic book readers, cellular telephones, personal digital assistants (PDAs), portable media players, tablet computers, netbooks, laptops, and the like. These electronic devices wirelessly communicate with a communications infrastructure to enable the consumption of the digital media items. In order to wirelessly communicate with other devices, these electronic devices include one or more antennas.

BRIEF DESCRIPTION OF DRAWINGS

The present invention will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
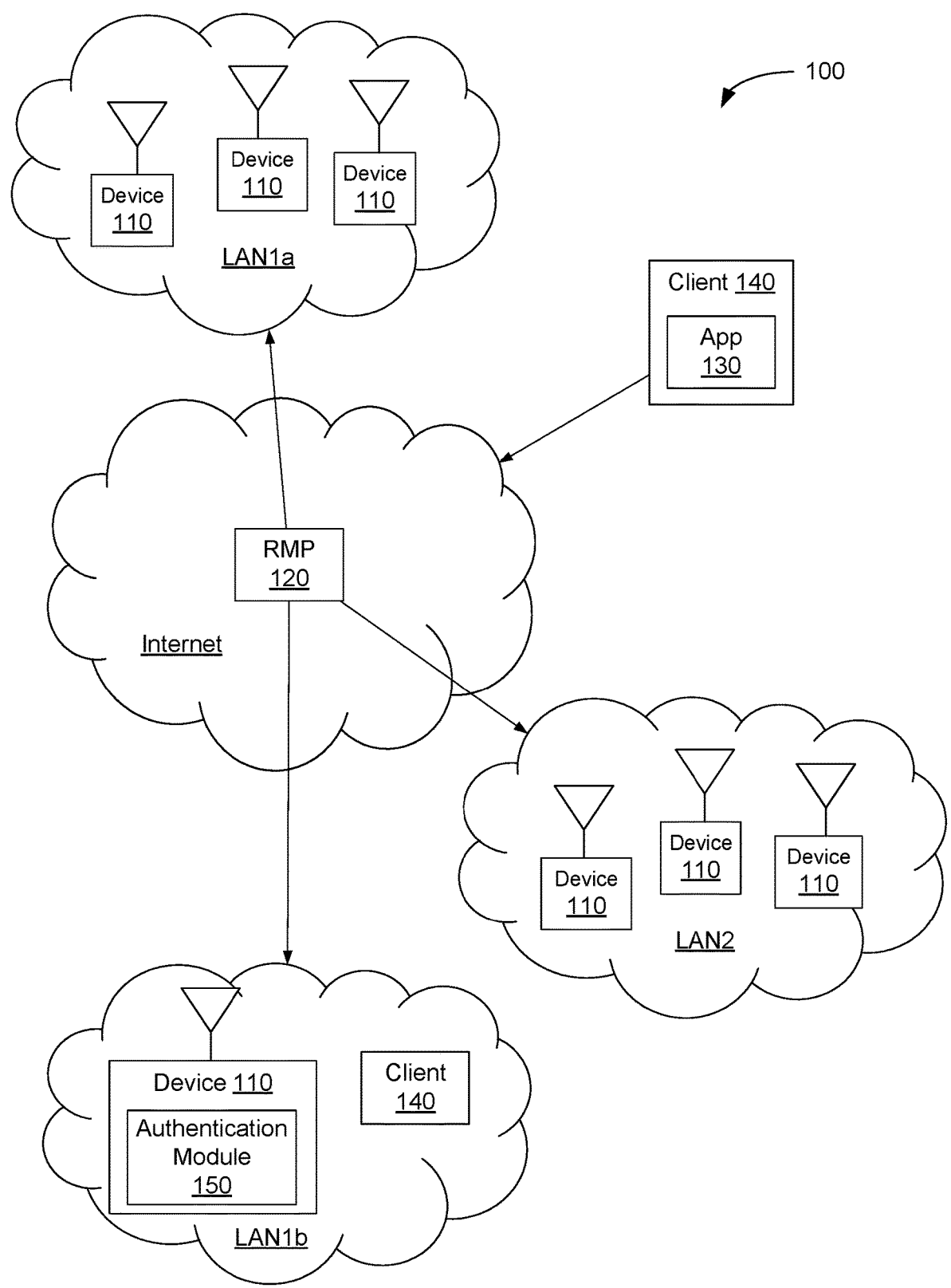
FIG. 1 is a block diagram illustrating hardware devices organized in a mesh network implementing role-based authorization for wireless network management services, according to an embodiment.

Technology for mesh network management including role-based authorization for wireless network management services is described herein. Devices of a mesh network may establish peer-to-peer wireless links for sharing data. In an illustrative example, a mesh network may be employed for providing network access to client devices in an environment of limited connectivity to broadband Internet infrastructure (e.g., for network access to homes in dense urban areas). In one embodiment, the mesh network uses IEEE 802.11 based Wi-Fi mesh networking.

Each wireless mesh device in a network may include a number of different services accessible by corresponding application program interface (API) endpoints. Requests directed to the endpoints can engage the respective services to perform an associated task or operation. Requests can be received from other wireless mesh devices in the network or an application running on a client device connected to the network. Each wireless mesh device includes an authentication module that is responsible for authenticating the identity of a requesting device and establishing a secure connection (e.g., a transport layer security (TLS) connection) between the requesting device and the wireless mesh device. For example, the authentication module may receive a cryptographic certificate from the requesting device, compare the certificate to a saved list of trusted certificates, and establish the secure connection if there is a match for the received certificate. Once the secure connection is established, the requesting device can send requests to any endpoint associated with the wireless mesh device, and can thus access any associated service.

A given wireless mesh device may, however, include one or more services for which it would be desirable to restrict access such that certain services cannot just be accessed by any requesting device with a valid certificate. For example, there may be certain services that should only be accessed by other wireless mesh devices and not by any users of the network. Additionally, there may be certain services that should only be accessed by a network owner and not by any other users of the network. Conventional authentication and access control techniques, however, do not differentiate between different certificates with respect to granting access to the various services associated with a wireless mesh device. As long as the provided certificate is valid, wireless mesh device will grant the requesting device access to all available services, which potentially comprise sensitive information and/or functionality.

Aspects of the present disclosure address these and other deficiencies by implementing role-based authorization for wireless network management services. In one embodiment, each network element is assigned a role that can be used to define corresponding authorization and access controls in the wireless network. Example roles can include wireless mesh device, network owner, network administrator, or other roles, and each service associated with a wireless mesh device is assigned one or more roles for which access is to be permitted. In one embodiment, each network element (i.e., a wireless mesh device or a client device) creates its own root certificate, and optionally one or more client certificates which are cryptographically signed by the root certificate. The root certificate can be associated with a role from the defined list of roles. When a new device is registered in the network, the device's root certificate is sent to a cloud-based router management platform, which distributes the root certificate, along with an indication of the corresponding role, to all of the wireless mesh devices in the network. Subsequently, when the new device attempts to connect to a wireless mesh device, such as by providing a client certificate, the authentication module on the wireless mesh device identifies the root certificate associated with the received client certificate, compares the root certificate to a list of trusted certificates, and establishes a secure connection if there is a match. When a request to access a service associated with the wireless mesh device is received via the secure connection, the authentication module identifies the role associated with the certificate, determines whether the role is authorized to access the requested service, and if so, authorizes access to the service. Additional details regarding this role-based authorization are provided below with respect to FIGS. 1-7.

Advantages of the techniques described herein include, but are not limited to, improved performance in the wireless mesh network. The role-based authorization allows wireless mesh devices to restrict access to certain endpoints, even among requesting devices that present a valid certificate. This improves security in the wireless mesh network, as well as provides more granular access controls, all without requiring changes to the underlying certificate authentication paradigm. This permits the role-based authorization to be implemented in legacy systems as well as new systems.

FIG. 1 is a block diagram illustrating hardware devices organized in a mesh network implementing role-based authorization for wireless network management services, according to an embodiment. A system 100 for mesh network management can include a plurality of wireless mesh devices 110 (e.g., wireless routers) and/or client devices 140 (e.g., mobile devices, such as computers, smart phones, etc.), and can additionally or alternatively include one or more router management platforms (RMPs) 120 and/or management applications 130. In one embodiment, the wireless mesh devices 110 and client devices 140 cooperatively define a mesh network (e.g., wherein the wireless mesh devices 110 are configured to provide Internet access, such as via a primary router connected by Ethernet to a cable modem) and an extended service set (ESS), but can additionally or alternatively define multiple networks (or no network) and/or multiple ESSs (or no ESS).

The system 100 can function to enable seamless wireless coverage of an area (e.g., a user's home) using mesh networking while reducing the complexity of configuring such a network. Typically, to configure an Internet-connected wireless mesh network, a user may configure a first router to serve as a gateway to the internet (e.g., by connecting the router to a cable modem). Further, some networking device (generally the aforementioned first router) is also configured to serve as a network address translation (NAT) server, a dynamic host configuration protocol (DHCP) server, and a wireless access point. Then, to extend wireless coverage throughout the area, additional devices (e.g., wireless routers, access points, repeaters) are added. Even in the simple case of two or three wireless mesh devices, the configuration options are virtually endless. For example, the wireless mesh devices could exist on a single bridged network, or could be separated into different networks (e.g., could be assigned to different virtual local area networks (VLANs)). The wireless mesh devices could be connected to each other by Ethernet cables, or simply serve as wireless repeaters. The wireless mesh devices could share available Wi-Fi channel space in any number of ways.

Even for experienced users, the array of network configurations available can be extremely overwhelming. In one embodiment, the system 100 performs much of this configuration both automatically and dynamically, thereby optimizing the network for a user's needs without requiring extensive computer networking knowledge or hassle. In other embodiment, however, the system 100 can be manually configured or otherwise configured.

In one embodiment, the wireless mesh devices 110 are dual-band routers (e.g., substantially similar to those described in U.S. patent application Ser. No. 15/008,251, the entirety of which is incorporated herein by reference). Additionally or alternatively, the wireless mesh devices 110 can be any suitable networking device (e.g., smart access points).

In one embodiment, the wireless mesh devices 110 include a wireless local area network (WLAN) radio (e.g., Wi-Fi® radio), a wireless personal area network (WPAN) radio (e.g., a Bluetooth® radio), an Ethernet interface, and a processor. The wireless mesh devices 110, however, can include any suitable wireless or wired communication module. The wireless mesh devices 110 can additionally or alternatively include any other hardware or software. In one example implementation, a smart router includes multiple wireless local area network (WLAN) radios (e.g., Wi-Fi® radios) including one or more 5 GHz radios and one or more 2.4 GHz radios, a Bluetooth radio capable of Bluetooth Smart communication, an auto-sensing gigabit Ethernet interface, an ARM processor, DDR RAM, EMMC storage (for router firmware), and a USB interface (e.g., for adding network-accessible storage).

The Wi-Fi radio(s) function(s) to provide wireless access to the wireless mesh devices 110. The Wi-Fi radio(s) preferably serve(s) to allow electronic client devices (e.g., smartphones, laptops, gaming consoles) to communicate wirelessly with the wireless mesh devices 110 and with each other through a LAN, as well as to allow wireless mesh devices 110 to communicate with each other over the mesh network.

In one embodiment, each Wi-Fi radio includes at least one antenna; additionally or alternatively, the Wi-Fi radio can include an interface to connect to an external antenna. Antennas can be of a variety of antenna types; for example, patch antennas (including rectangular and planar inverted F), reflector antennas, wire antennas (including dipole antennas), bow-tie antennas, aperture antennas, loop-inductor antennas, ceramic chip antennas, antenna arrays, and fractal antennas. The Wi-Fi radio(s) may support(s) communication over all of IEEE 802.11a/b/g/n/ac standards (e.g., and optionally over any other IEEE 802.11 standards, such as ax, k, r, v, etc.), but can additionally or alternatively support communication according to any standard or communication protocol (or no standard at all).

In one embodiment, the Wi-Fi radios operate using single-input/single-output (SISO) communication techniques, but can additionally or alternatively operate using multiple-input and/or multiple-output communication techniques (e.g., SIMO, MISO, MIMO). If the Wi-Fi radios operate using MIMO techniques, the Wi-Fi radios can use any type of MIMO techniques (e.g., precoding, spatial multiplexing, space-division multiple access, and/or diversity coding). Further, the Wi-Fi radios can perform MIMO communication either independently (e.g., a radio performs MIMO communication with multiple antennas coupled to that radio) or cooperatively (e.g., two separate radios perform MIMO communication together).

In one embodiment, the Bluetooth radio functions to allow devices to communicate with the wireless mesh devices 110 over a connection mechanism alternative to Wi-Fi. The Bluetooth radio can be used to allow the wireless mesh devices 110 to be configured for the first time by a smartphone (or other Bluetooth-enabled computing device). The Bluetooth radio can additionally or alternatively be used for any other purpose; for example, for configuring the wireless mesh devices 110 at a different time, for communication between wireless mesh devices 110, or for communication with smart devices in a home (e.g., smart locks, light bulbs). The Bluetooth radio may support the Bluetooth 4.0 standard, including communications capabilities for classic Bluetooth as well as Bluetooth Low-Energy (BTLE). The Bluetooth radio may switch between classic Bluetooth and Bluetooth Low-Energy, but can additionally or alternatively be capable of communicating over both simultaneously.

In one embodiment, the Ethernet interface functions to provide wired connectivity to the wireless mesh devices 110. The Ethernet interface can allow wired devices (including other wireless mesh devices 110) to connect to the wireless mesh devices 110. The Ethernet interface can include a plurality of Ethernet ports. Ports of the Ethernet interface may be capable of 1000BASE-T (i.e., gigabit) communication, but can additionally or alternatively be capable of communication at any rate. The Ethernet interface can automatically set the communication rate based on the capabilities of connected devices, but can additionally or alternatively set the communication rate manually. In addition to the Ethernet interface, the wireless mesh devices 110 can additionally or alternatively perform wired communication over any wired interface. For example, the wireless mesh devices 110 can perform communication through a power line interface (e.g., Ethernet over Power).

Each wireless mesh device 110 may include a microprocessor and can additionally or alternatively include any other hardware. For example, the wireless mesh devices 110 can include a USB interface (for connection of network-attached storage, a DLNA server, etc. or for configuration purposes). In one embodiment, the wireless mesh devices 110 include a hardware encryption module (HEM). The HEM is preferably a chip that stores an encryption key securely (e.g., the Atmel SHA204) and performs data encryption based on that key, but can additionally or alternatively be any hardware module capable of encrypting transmissions from and/or decrypting transmissions to the wireless mesh devices 110.

In one embodiment, the wireless mesh devices 110 store firmware and/or software on an embedded MultiMediaCard (eMMC), but can additionally or alternatively store firmware and/or software in any suitable storage solution. The wireless mesh devices 110 may operate as a Linux server running Python programs, but can additionally or alternatively operate using any software and/or firmware. The wireless mesh devices 110 can be configured using the management application 130 operating on a client device 140 or other remote electronic device (e.g., a user's smartphone), but can additionally or alternatively be configured by any suitable manner (e.g., by a web interface).

The wireless mesh devices 110 can communicate with each other using the IEEE 802.11s protocol (and/or a modified version thereof), such as using Simultaneous Authentication of Equals (SAE)-based encryption and hybrid wireless mesh protocol (HWMP) path selection, but can additionally or alternatively communicate with each other in any manner. In one embodiment, the wireless mesh devices 110 are configured and/or managed by the router management platform 120 (or any suitable remote management platform). For example, wireless mesh devices 110 can be configured by altering stored configuration profiles in a remote server (e.g., part of the router management platform 120), after which the stored configuration profiles are pushed to the wireless mesh devices 110. This technique is particularly useful in mesh networking applications; if the router management platform 120 is aware that three smart routers are intended for use in a single network, the router management platform 120 can attempt to bridge the networks of the three routers regardless of physical location or existing network topology.

The router management platform 120 can additionally function to manage connections and/or permissions associated with various networks. For example, a user of the router management platform 120 associated with one network can have guest permissions on another network (e.g., users of LAN1 can be granted permissions with respect to LAN2 via the platform). As another example, the router management platform 120 can be used for (or can otherwise facilitate) bridging two networks via a VPN tunnel (e.g., two physical networks LAN1a and LAN1b into a single logical network).

The router management platform 120 can additionally or alternatively be used to collect connection data from the wireless mesh devices 110 and/or provide this data (or analysis of this data) to users either via the wireless mesh devices 110 or otherwise (e.g., via a web portal).

The system 100 can additionally include a management application 130 that functions to manage wireless mesh devices 110 that are part of a network. The management application 130 may be a native application running on a smartphone (e.g., an iOS or Android application), but can additionally or alternatively be any suitable application (e.g., a web app, a desktop app, etc.). The management application 130 can be used to perform or aid in wireless mesh device 110 configuration, but can also be used to collect data used to implement the functionality described herein. For example, management application 130 operable on a client device 140 for which location data is desired can collect (and potentially analyze and/or transmit) data that can be used to perform device localization.

Wireless mesh devices 110 of the same LAN can be communicatively coupled together to form a mesh network. Wireless mesh devices 110 can communicate to each other and/or to client devices 140 in any manner, e.g., 2.4 GHz Wi-Fi, 5 GHz Wi-Fi, Bluetooth, wired Ethernet. The channels used by the radios of the wireless mesh devices 110 can be set to reduce interference across the network. For example, two wireless mesh devices 110 near each other can use the same 5 GHz band (allowing those two wireless mesh devices 110 to communicate with each other and with devices, but potentially causing collisions for communication from client devices 140 near both wireless mesh devices 110), but a different 2.4 GHz band (allowing client devices 140 near both wireless mesh devices 110 to communicate to one wireless mesh device 110 without interfering with communication of other client devices 140 to the other wireless mesh device 110). Wireless mesh device 110 channels can be orthogonal or overlapping. For example, wireless mesh devices 110 near each other can choose different, but overlapping 2.4 GHz bands, allowing those wireless mesh devices 110 to still communicate with each other while also reducing client device interference.

Wireless mesh device channels can be set in any manner. In one example implementation, a first wireless mesh device 110 selects a 2.4 GHz channel (referred to as 2.4 A) and a 5 GHz channel (5A) based on a radio survey. Each additional wireless mesh device 110 then selects the same 5 GHz channel (5A) but selects the 2.4 GHz channel based on a radio survey (e.g., trying to minimize 2.4 GHz interference between wireless mesh devices 110). Wireless mesh device channels can be set individually by wireless mesh devices 110, in concert by a set of wireless mesh devices 110, by the management platform 120, or by any other agent.

Wireless mesh device channels can also be modified at any time. For example, a wireless mesh device 110 having selected a channel by the technique described in the preceding paragraph can switch its 5 GHz channel in response to heavy traffic on that channel by client devices 140. Note that in this case, the wireless mesh device 110 may additionally need to change its 2.4 GHz channel as well (as the wireless mesh device 110 may have to communicate with other devices on the 2.4 GHz band now instead of the 5 GHz band).

Wireless mesh devices 110 can additionally or alternatively attempt to modify any other parameters related to inter-device links and/or node-client links. For example, wireless mesh devices 110 can adjust antenna patterns and/or gain to reduce network interference. Additionally or alternatively, wireless mesh devices 110 can perform beamforming or beam-steering (potentially with dynamic gain) for the same purpose. Similar to channels, other wireless mesh device parameters can be set individually by wireless mesh devices 110, in concert by a set of wireless mesh devices 110, by the management platform 120, or by any other agent.

In one embodiment, one or more of wireless mesh devices 110 include an authentication module 150. Authentication module 150 can implement role-based authorization for wireless network management services on the wireless mesh devices 110. In one embodiment, authentication module 150 establishes a secure communication session (e.g., a Transport Layer Security (TLS) connection) between wireless mesh device 110 and a requesting device. The requesting device can include, for example, another wireless mesh device 110 or a client device 140. Once the secure communication session is established, authentication module can receive a request directed to a service provided by the wireless mesh device. In one embodiment, the request comprises a client certificate associated with the requesting device. The client certificate can be generated by the requesting device and signed by a root certificate that is recognized by the wireless mesh device, and thus can be used by the requesting device to authenticate itself to the wireless mesh device. Authentication module 150 further identifies a role assigned to the requesting device and associated with the client certificate. In one embodiment, the role includes certain access permissions which are conveyed to any device to which the role is assigned. For example, the root certificate of the requesting device may be associated with a given role, and the corresponding permissions are conveyed with any client certificate signed by the root certificate. The authentication module further determines whether the role assigned to the requesting device conveys permission to the requesting device to access the service, and if so, forwards the request to the service. Additional details regarding operations of authentication module 150 are provided below.

Figure 2:
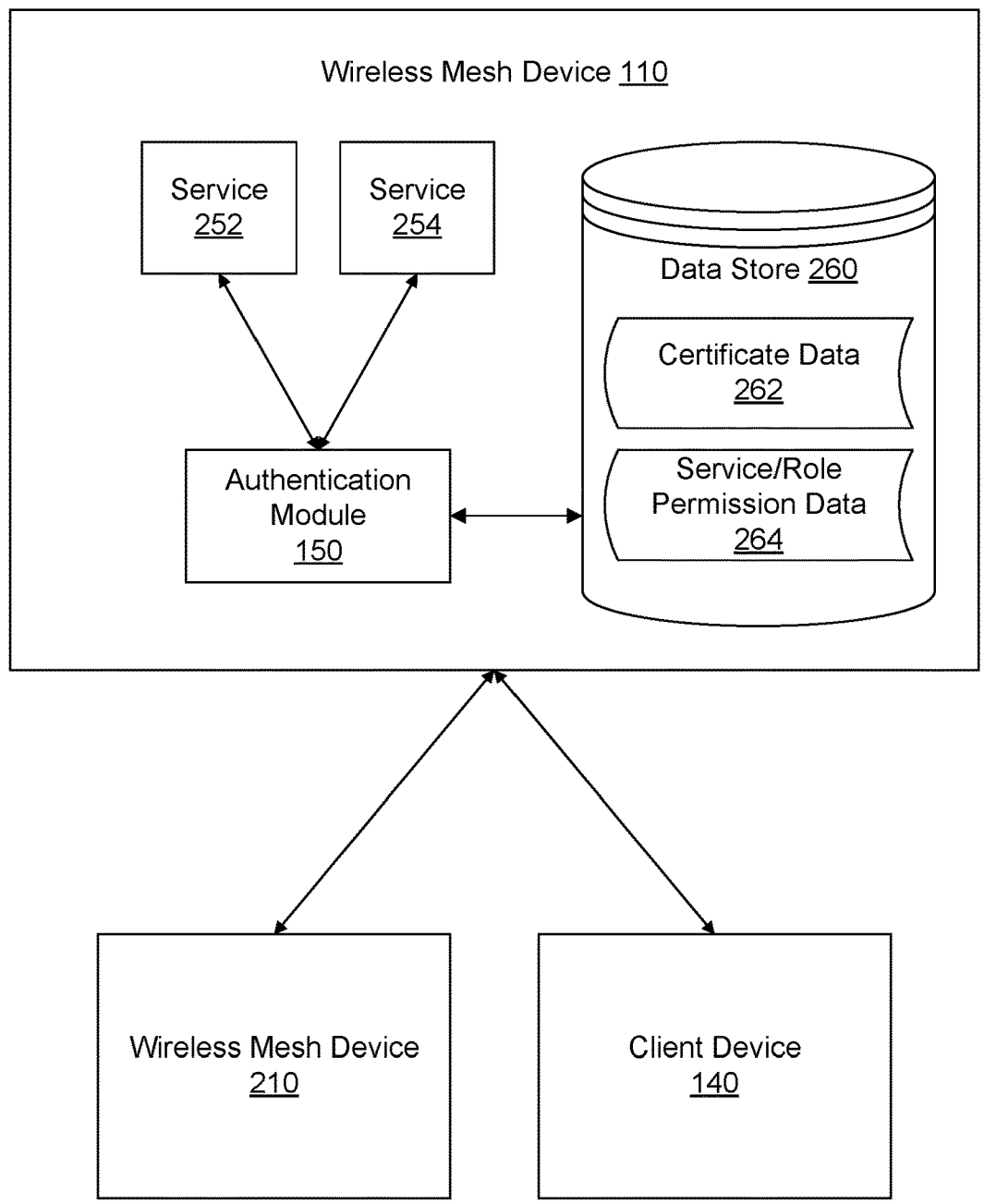
FIG. 2 is a block diagram illustrating a wireless mesh device with an authentication module configured for role-based authorization, according to an embodiment.
Figure 3:
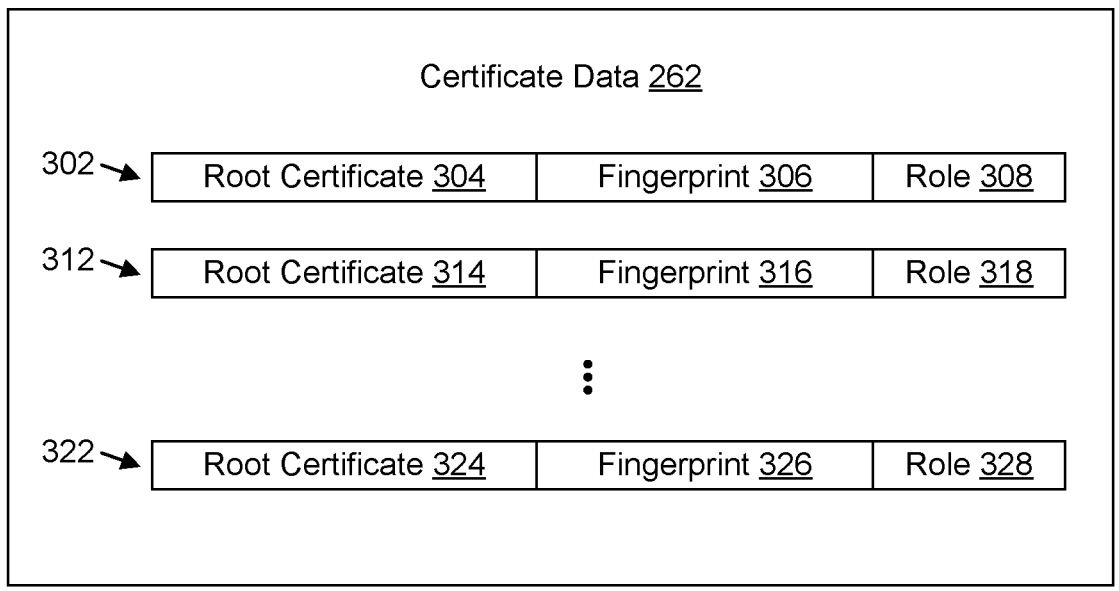
FIG. 3 is a block diagram illustrating certificate data and permission data used for role-based authorization in a wireless mesh network, according to an embodiment.
Figure 3:
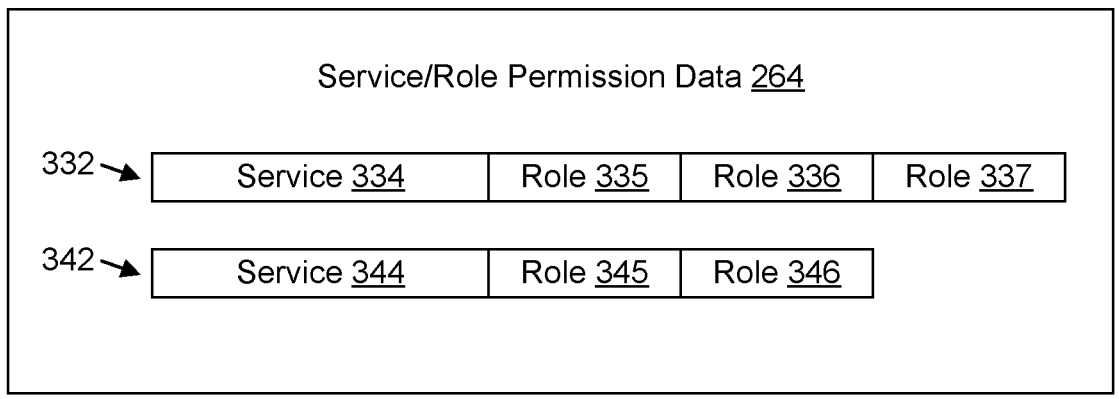

FIG. 2 is a block diagram illustrating a wireless mesh device with an authentication module configured for role-based authorization, according to an embodiment. In one embodiment, wireless mesh device 110 includes an authentication module 150, a number of services 252, 254 and a data store 260. This arrangement of modules and components may be a logical separation, and in other embodiments, these modules or other components can be combined together or separated into further components, according to a particular implementation. In one embodiment, data store 260 includes certificate data 262, and service/role permission data 264. In one implementation, one physical device (e.g., wireless mesh device 110) may include all of authentication module 150, services 252, 254, and data store 260. In another embodiment, data store 260 may be external to the physical device and may be connected over a network or other connection. In other implementations, wireless mesh device 110 and authentication module 150 may include different and/or additional components and applications which are not shown to simplify the description. Data store 260 may be embodied on one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium. As illustrated in FIG. 3, wireless mesh device 110 can be communicably coupled to one or more other network components, such as another wireless mesh device 210 and/or client device 140.

As will be described in more detail below, authentication module 150 of wireless mesh device 110 can establish a secure communication session with a requesting device, such as one of wireless mesh device 210 or client device 140. In one embodiment, authentication module 150 receives a connection request, including a cryptographic certificate, and compares the received certificate to a list of certificates stored in certificate data 262 in data store 260. If the received certificate matches a certificate listed in certificate data 262, authentication module 150 can establish the secure communication session (e.g., a transport layer security (TLS) connection).

FIG. 3 is a block diagram illustrating certificate data 262 and permission data 264 used for role-based authorization in a wireless mesh network, according to an embodiment. The certificate data 262 can be populated and/or updated periodically by a cloud-based service, such as router management platform 120. For example, when a new device is added to and/or registered with the wireless mesh network, that device can provide a certificate (e.g., a root certificate or a client certificate that has been cryptographically signed by the root certificate) to the router management platform 120, which then distributes the certificate to all other devices in the wireless mesh network. Authentication module 150 can receive the certificate and store a copy and/or indication of the certificate in certificate data 262 for later use in establishing inter-device connections. For example, certificate data 262 can include number of entries 302, 312, 322, each corresponding to a different received certificate 304, 314, 324. Each certificate 304, 314, 324 is associated with a different device in the wireless mesh network, such as a wireless mesh device or client device. When a connection request or a service access request is received, authentication module 150 can compare a certificate received with the request to the certificates 302, 312, 322 stored in certificate data 262.

In one embodiment, rather than receiving the entire certificate with the connection request, authentication module 150 receives a fingerprint of the certificate and compares the received fingerprint to one or more fingerprints stored in certificate data 262. As shown in FIG. 3, each of entries 302, 312, 322 can optionally include a fingerprint 306, 316, 326 of the corresponding certificate 303, 314, 324. In implementations where the fingerprints 306, 316, 326 are stored in certificate data 262, the corresponding certificates 304, 314, 324 themselves may or may not be stored in certificate data 262 as well. For example, the fingerprints 306, 316, 326 of the could be generated using a secure hash algorithm (e.g., SHA-256) applied to the original certificate s 304, 314, 324. The secure hash algorithm creates a fingerprint of fixed length (e.g., 256 bits) that is unique to the certificate from which it is computed, and which cannot be used to recreate the original certificate. In one embodiment, the entries 302, 312, 322 in certificate data 262 further include an indication of a role 308, 318, 328 associated with each certificate or fingerprint. As described herein, there can be any number of defined roles for the wireless mesh network, each of which confers certain access permissions to the available services (e.g., services 252 and 254).

In one embodiment, the defined roles include "wireless mesh device," "network owner," and "network administrator." In other embodiments, there can be different and/or additional roles defined in the network. The "wireless mesh device" role can be associated with wireless mesh devices in the network, such as wireless mesh device 210, and can convey access permissions to wireless mesh device 210 to access certain services. In one embodiment, the "wireless mesh device" role grants permission to access all services, such as services 252 and 254, to any device which has been assigned the role.

The role of "network owner" can be associated with certain client devices in the network, such as client device 140, for example. In one embodiment, the role is associated with the client device 140 based on a user account with which a user logs in to application 130 on the client device 140. For example, if a user (e.g., the homeowner or business owner) with a certain user account logs into application 130 on client device 140 and attempts to connect the client device 140 to the wireless mesh network 100, RMP 120, or other logic, can assign the "network owner" role to the client device 140 based on the user account. When the client device 140 creates a new certificate (i.e., a root certificate), the certificate is associated with the "network owner" role. Thus, when a request is received from client device 140 including that root certificate, or a client certificate signed by the root certificate, authentication module 150 can grant access to services 252 and 254 based on the permissions associated with the "network owner" role.

Another possible role is the "network administrator" role, which can be associated with devices belonging to other users of the wireless mesh network. In one embodiment, the "network administrator" role conveys a lower level of access permissions to the associated client devices than the "network owner" role. Similarly, if a user (e.g., a family member, guest, or employee) with a certain user account logs into application 130 on client device 140 and attempts to connect the client device 140 to the wireless mesh network 100, RMP 120, or other logic, can assign the "network administrator" role to the client device 140 based on the user account. When the client device 140 creates a new certificate (i.e., a root certificate), the certificate is associated with the "network administrator" role. Thus, when a request is received from client device 140 including that root certificate, or a client certificate signed by the root certificate, authentication module 150 can grant access to services 252 and 254 based on the permissions associated with the "network administrator" role.

Referring again to FIG. 2, services 252 and 254 are examples of any number of possible services provided via wireless mesh device 110. Each of services 252 and 254 can be associated with respective API endpoints to which access requests for the corresponding services 252 and 254 can be sent. Each of services 252 and 254 can be configured to provide respective functionality in response to received requests. Depending on the implementation, one or more of services 252 and 254 can include functionality that is executed locally on wireless mesh device 110, and/or one or more of services 252 and 254 can include functionality that is executed remotely, such as on a server device accessible over the Internet. Some examples of this functionality include rebooting the wireless mesh device, performing debugging operations, performing a network scan, providing an access token, etc. It should be appreciated that in other embodiments, wireless mesh device 110 can include or provide access to any number of different and/or additional services.

Figure 4:
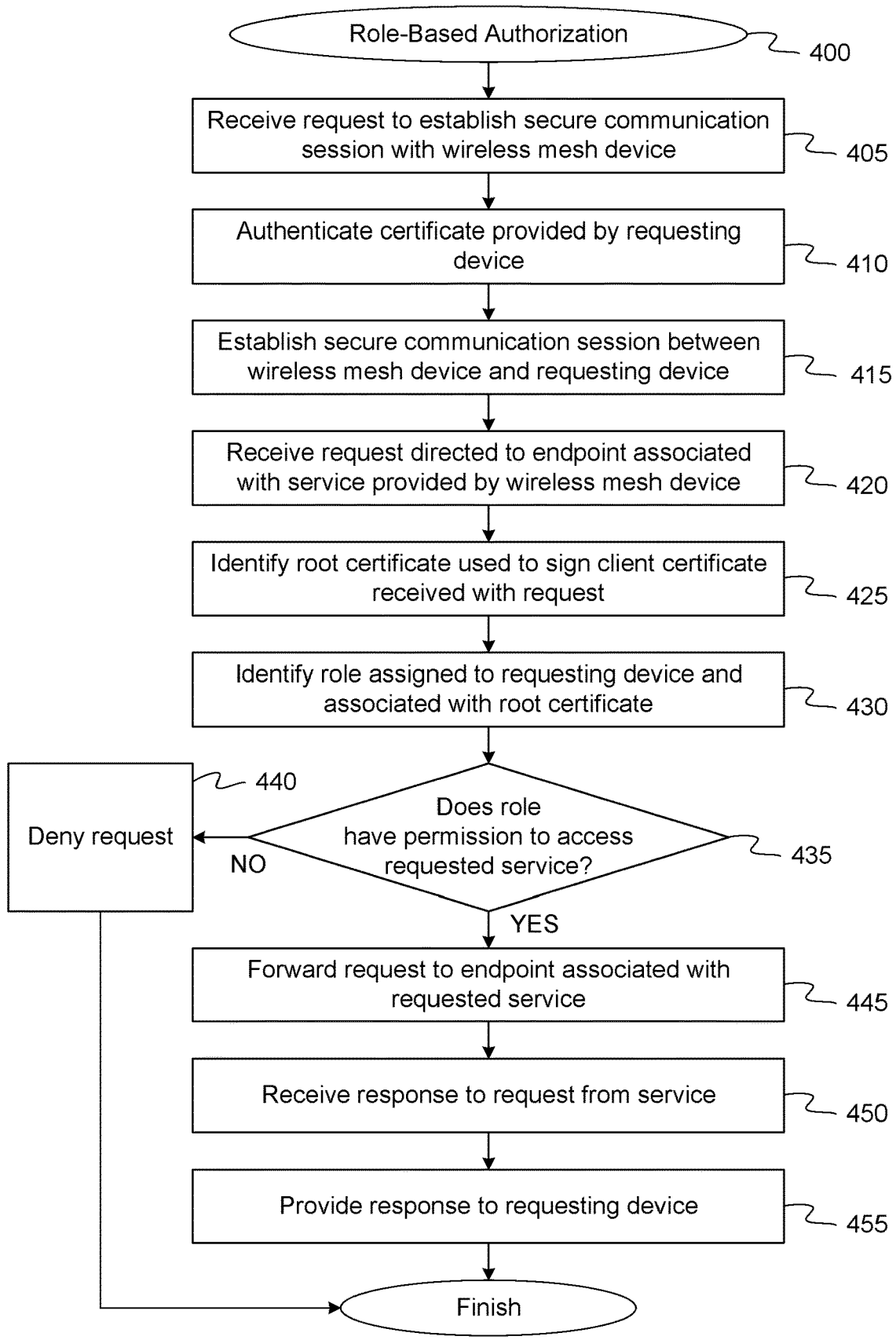
FIG. 4 is a flow diagram illustrating a method of role-based authorization for wireless network management services, according to an embodiment.

FIG. 4 is a flow diagram illustrating a method of role-based authorization for wireless network management services, according to an embodiment. The method 400 may be performed by processing logic that comprises hardware (e.g., circuitry, dedicated logic, programmable logic, microcode, etc.), software, firmware, or a combination thereof. In one embodiment, method 400 may be performed by authentication module 150, which is executed by a processing device within wireless mesh device 110, as shown in FIG. 1 and FIG. 2.

Referring to FIG. 4, at operation 405, the processing logic receives a request to establish a secure communication session between a client device, such as client device 140, associated with a requesting device and the wireless mesh device 110. In one embodiment, the secure communication session includes a Transport Layer Security (TLS) connection, and the request includes a cryptographic certificate (e.g., a root certificate) associated with the requesting device. In one embodiment, the request and certificate are received by authentication module 150. In one embodiment, the request includes a fingerprint or other unique identifier of the certificate, rather than the entire certificate itself. The certificate can include, for example, a TLS or SSL certificate issued by a certificate authority, and may contain a public key associated with the requesting device, which can be used to validate the requesting device's identity.

At operation 410, the processing logic authenticates the cryptographic certificate. In one embodiment, authentication module 150 compares the received certificate or fingerprint to a set of authorized certificates or fingerprints, such as those stored as certificate data 262 in data store 260 on wireless mesh device 110. For example, authentication module 150 may determine whether the received certificate or fingerprint matches (i.e., is identical to) one or more of the certificates or fingerprints in certificate data 262. As described above, the set of certificates or fingerprints may represent authorized requesting devices and/or associated client devices, as indicated by router management platform 120.

At operation 415, the processing logic establishes the secure communication session between the client device 140 and the wireless mesh device 110. In one embodiment, responsive to authenticating the cryptographic certificate, authentication module 150 can establish the TLS connection. This may include for example, a handshake operation, which generates a set of session keys for encrypting messages sent over the secure connection.

At operation 420, the processing logic receives a request directed to a service, such as one of services 252, 254, provided by the wireless mesh device 110 in a wireless mesh network. In one embodiment, the request is received via the secure connection established at operation 415, and the request includes a client certificate associated with a requesting device. For example, the requesting device may be one of wireless mesh device 210, client device 140, or some other device in the wireless mesh network. The client certificate may include, for example, example a TLS or SSL certificate issued by a certificate authority. In one embodiment, the request includes a fingerprint or other unique identifier of the certificate, rather than the entire certificate itself.

At operation 425, the processing logic identifies a root certificate used to cryptographically sign the client certificate. In one embodiment, the client certificate is generated by the requesting device and cryptographically signed by the root certificate associated with the requesting device. In order to identify the root certificate from the received client certificate, authentication module 150 may examine the client certificate to determine information about the certificate authority (CA) that issued the client certificate. For example, the client certificate may include an "issuer" field that indicates the identity of the certificate authority. In another embodiment, authentication module 150 may follow a chain of trust by obtaining the public key of the issuing certificate authority and verifying the digital signature on the client certificate.

At operation 430, the processing logic identifies a role assigned to the requesting device and associated with the root certificate. As described above, certificate data 262 includes a set of authorized certificates (i.e., root certificates) and/or fingerprints of the authorized certificates, as well as an indication of a role associated with each certificate or fingerprint. The role associated with the requesting device can be one of a plurality of roles, where each of the plurality of roles has access to a respective subset of the services 252, 254 provided by the wireless mesh device 110. In one embodiment, the role assigned to the requesting device may be one of a wireless mesh device, an owner of the wireless mesh network, or an administrator of the wireless mesh network. In other embodiments, ere can be any number of additional and/or different roles defined for the wireless mesh network. In one embodiment, authentication module 150 can identify, in certificate data 262, an entry associated with the root certificate identified at operation 425, and determine, from that entry, the role assigned to the requesting device and associated with the root certificate. For example, as shown in FIG. 3, certificate data 262 includes a number of entries 302, 312, 322, where each entry corresponds to a root certificate 304, 314, 324. Thus, when a client certificate is received, and a corresponding root certificate is identified, authentication module 150 can search the entries 302, 312, 322 for a certificate 304, 314, 324 that corresponds to the received certificate. When such an entry is identified, authentication module 150 can further identify the role 308, 318, 328 associated with the certificate from the entry.

Figure 5:
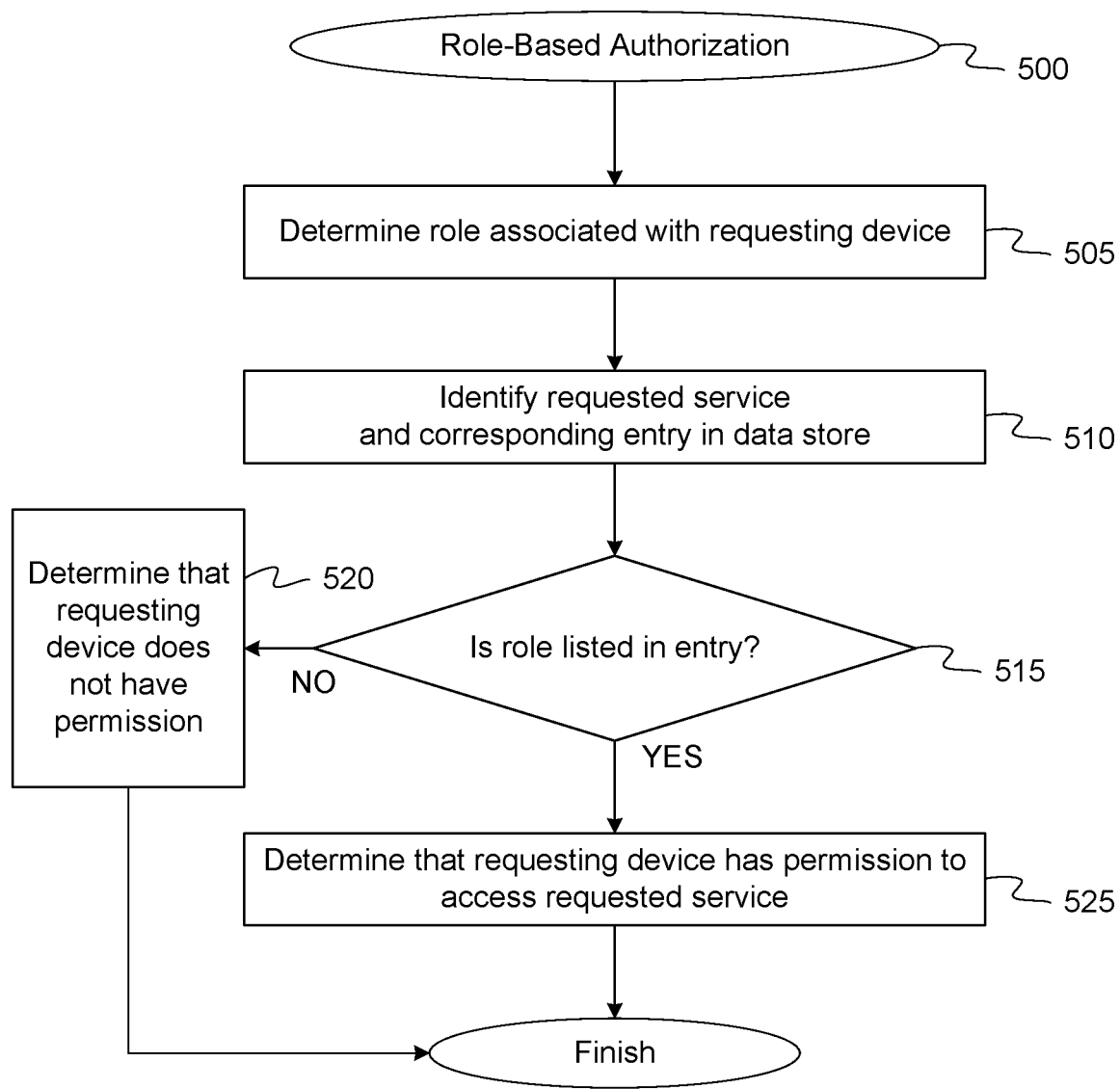
FIG. 5 is a flow diagram illustrating a method of role-based authorization for access to a service provided via a wireless mesh device, according to an embodiment.

At operation 435, the processing logic determines whether, based on the role, the requesting device has permission to access the service provided by the wireless mesh device, as shown in FIG. 5.

FIG. 5 is a flow diagram illustrating a method of role-based authorization for access to a service provided via a wireless mesh device, according to an embodiment. The method 500 may be performed by processing logic that comprises hardware (e.g., circuitry, dedicated logic, programmable logic, microcode, etc.), software, firmware, or a combination thereof. In one embodiment, method 500 may be performed by authentication module 150, which is executed by a processing device within wireless mesh device 110, as shown in FIG. 1 and FIG. 2.

At operation 505, the processing logic determines the role associated with the requesting device, as described above. At operation 510, the processing logic identifies a requested service and a corresponding entry in service/role permission data 264 in data store 260. In one embodiment, the received requested includes an indication of one of services 252 and 254. As illustrated in FIG. 3, service/role permission data 264 can include number of entries 332, 342, each corresponding to a different service, such as services 252 and 254. Each of entries 332, 342 can include an indication of the corresponding service. For example, entry 332 includes indication 334 and entry 342 includes indication 344. Each of entries 332, 342 further includes a list or other indication of one or more roles that convey permission to access the corresponding service. Each service may be accessible by network devices having different associated roles. For example, entry 332 includes a list of roles 335, 336, and 337, while entry 344 includes a list of roles 345 and 346. Thus, a device associated with one of the roles listed in a given entry has permission to access the service identified in that same entry. For example, only the "wireless mesh node" role may convey permission to associated devices for access to certain services. Other roles, such as one or both of "owner" or "administrator" may convey permission to associated devices for access to other services. In one embodiment, the access permissions for certain roles are predefined and stored in service/role permission data 264 when the wireless mesh device 110 is first added to the wireless mesh network. In some embodiments, the access permissions for roles can be updated periodically.

At operation 515, the processing logic determines whether the role associated with the requesting device is listed in the entry corresponding to the requested service. In one embodiment, authentication module 150 can search the entries 332, 342 for a service 334, 344 that corresponds to the requested. When such an entry is identified, authentication module 150 can further identify the roles associated with the service from the entry. Authentication module 150 can compare the role associated with the requesting device to the roles in the entry corresponding to the requested service to determine whether the role associated with the requesting device conveys permission to the requesting device to access the requested service.

Responsive to determining that the role associated with the requesting device is not listed in the entry corresponding to the requested service, at operation 520, the processing logic determines that the requesting device does not have permission to access the requested service. Responsive to determining that the role associated with the requesting device is listed in the entry corresponding to the requested service, at operation 525, the processing logic determines that the requesting device does have permission to access the requested service.

Referring again to FIG. 4, responsive to determining that the requesting device does not have permission to access the service, at operation 440, the processing logic denies the request. For example, authentication module 150 may prevent the request from being forwarded to the service and may optionally return an error message or other message indicating the denial to the requesting device (i.e., wireless mesh device 210 or client device 140.)

Figure 6:
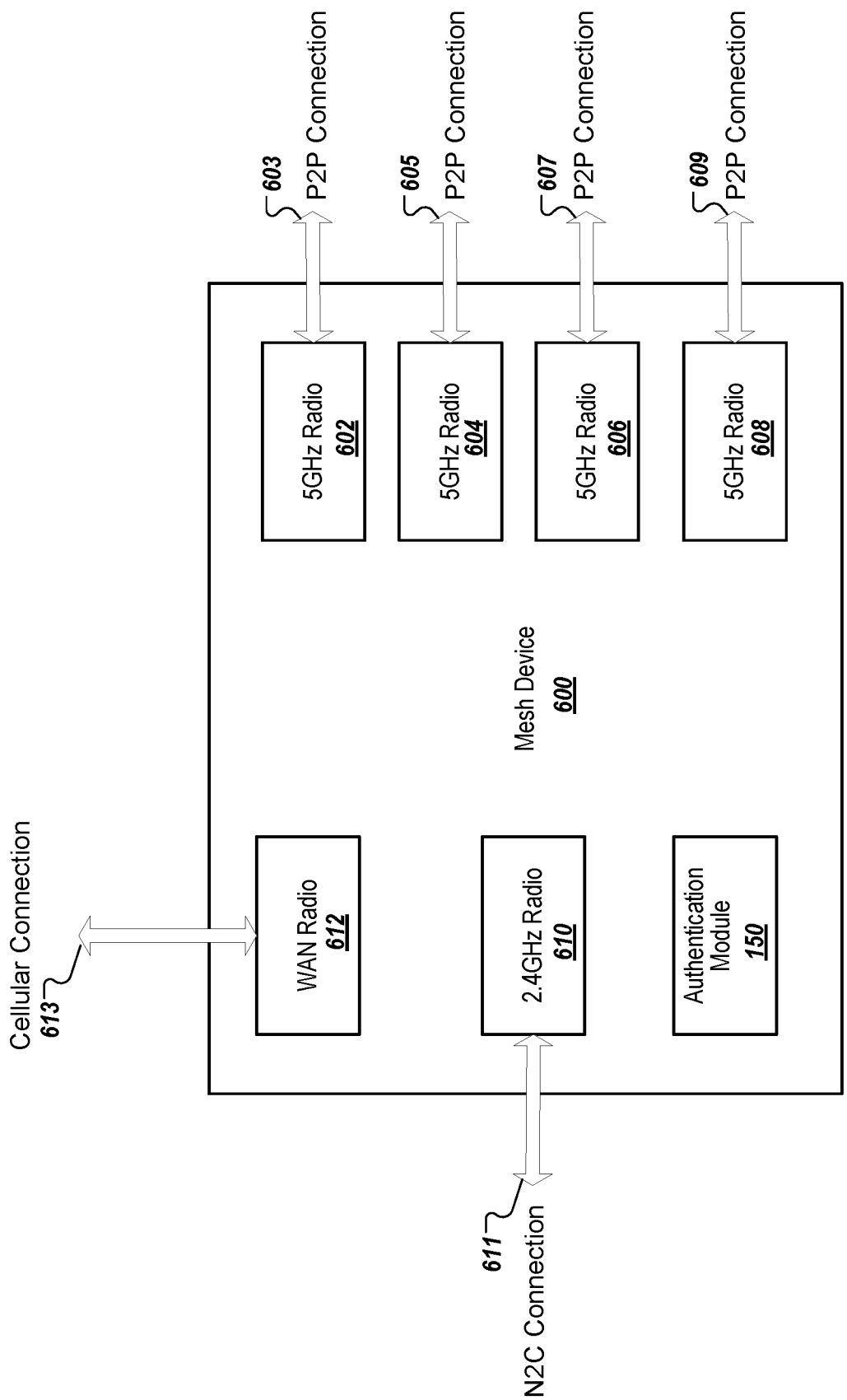
FIG. 6 is a block diagram of a mesh device with multiple radios according to one embodiment.

Responsive to determining that the role assigned to the requesting device has permission to access the service, at operation 445, the processing logic forwards the request to the service. At operation 450, the processing logic receives, from the service, a response to the request. Depending on the functionality provided by the service, the response can include either requested data, or confirmation that a requested action was performed. At operation 455, the processing logic sends the response to the requesting device FIG. 6 is a block diagram of a mesh device 600 with multiple radios according to one embodiment. The mesh device 600 may correspond to one of wireless mesh devices 110 of FIG. 1. The mesh device 600 includes a first 5 GHz radio 602, a second 5 GHz radio 604, a third 5 GHz radio 606, a fourth 5 GHz radio 608, a 2.4 GHz radio 610, and a cellular radio 612. The first 5 GHz radio 602 creates a first P2P wireless connection 603 between the mesh device 600 and another mesh device (not illustrated) in a mesh network. The second 5 GHz radio 604 creates a second P2P wireless connection 605 between the mesh device 600 and another mesh device (not illustrated) in the mesh network. The third 5 GHz radio 606 creates a third P2P wireless connection 607 between the mesh device 600 and another mesh device (not illustrated) in the mesh network. The fourth 5 GHz radio 608 creates a fourth P2P wireless connection 609 between the mesh device 600 and another mesh device (not illustrated) in the mesh network. The 2.4 GHz radio 610 creates an N2C wireless connection 611 between the mesh device 600 and a client consumption device (not illustrated) in the mesh network. The N2C wireless connection may be one of a second set of one or more WLAN connections that operate at a second frequency of approximately 2.4 GHz. The cellular radio 612 creates a cellular connection between the mesh device 600 and a device in a cellular network (not illustrated). In other embodiments, more than one 2.4 GHz radio may be used for more N2C wireless connections. Alternatively, a different number of 5 GHz radios may be used for more or less P2P wireless connections with other mesh devices. In other embodiments, multiple cellular radios may be used to create multiple cellular connections.

In some embodiments, the mesh device 600 may be any one of the mesh network devices described herein. In one embodiment, the mesh device 600 may be an ingress device or a mini-POP device that has attached storage and a network connection to access content outside of the mesh network. Multiple network hardware devices are wirelessly connected through a network backbone formed by multiple P2P wireless connections. These P2P wireless connections are wireless connections between different pairs of the network hardware devices. The P2P wireless connections may be a first set of WLAN connections that operate at a first frequency of approximately 5.0 GHz. The multiple network hardware devices may be wirelessly connected to one or more client consumption devices by one or more N2C wireless connections. Also, the multiple network hardware devices may be wirelessly connected to a mesh network control services (MNCS) device by cellular connections. Each network hardware device includes a cellular connection to an MNCS service hosted by a cloud computing system. The cellular connections may have lower bandwidths than the point-to-point wireless link.

During operation, the mesh device 600 may receive a first request for a first content file from the first client consumption device over the first N2C connection 611. The mesh device 600 sends a second request for the first content file to a second network hardware device through the network backbone via a first set of zero or more intervening network hardware devices between the first network hardware device and the second network hardware device. The mesh device 600 receives the first content file through the network backbone via the first set of zero or more intervening network hardware devices and sends the first content file to the first client consumption device over the first N2C connection 611. In a further embodiment, the mesh device 600 includes the WAN radio 612 to wirelessly connect to a MNCS device by a cellular connection 613 to exchange control data.

In some embodiments, a path between the mesh device 600 and an ingress device (or any other mesh network device) could include zero or more hops of intervening network hardware devices. In some cases, the path may include up to 12-15 hops within a mesh network of 100×100 network hardware devices deployed in the mesh network. In some embodiments, a number of network hardware devices in the mesh network is greater than fifty. The mesh network may include hundreds, thousands, and even tens of thousands of network hardware devices.

In some embodiments, the mesh device 600 includes memory to store content files, control and command data, as well as the aggregate data described herein. The memory of the first network hardware device may be volatile memory, non-volatile memory, or a combination of both. When a content file is not stored in the memory or the storage of the mesh device 600, the mesh device 600 generates and sends a request to another device in the mesh network. Intervening network hardware devices can make similar determinations to locate the content file in the mesh network. In the event that the first content file is not stored in the mesh network, the content file can be requested from the mini-POP device. When the mini-POP device does not store the content file, the mini-POP can take action to obtain the first content file, such as requesting the first content file from a CDN over a point-to-point link. Alternatively, the human in the loop process can be initiated as described herein.

In a further embodiment, the P2P wireless connections 603, 605, 607, 609 are WLAN connections that operate in a first frequency range and the N2C connections 611 are WLAN connections that operate in a second frequency range. In another embodiment, the P2P wireless connections 603, 605, 607, 609 operate at a first frequency of approximately 5.0 GHz and the N2C connections 611 operate at a second frequency of approximately 2.4 GHz.

Figure 7:
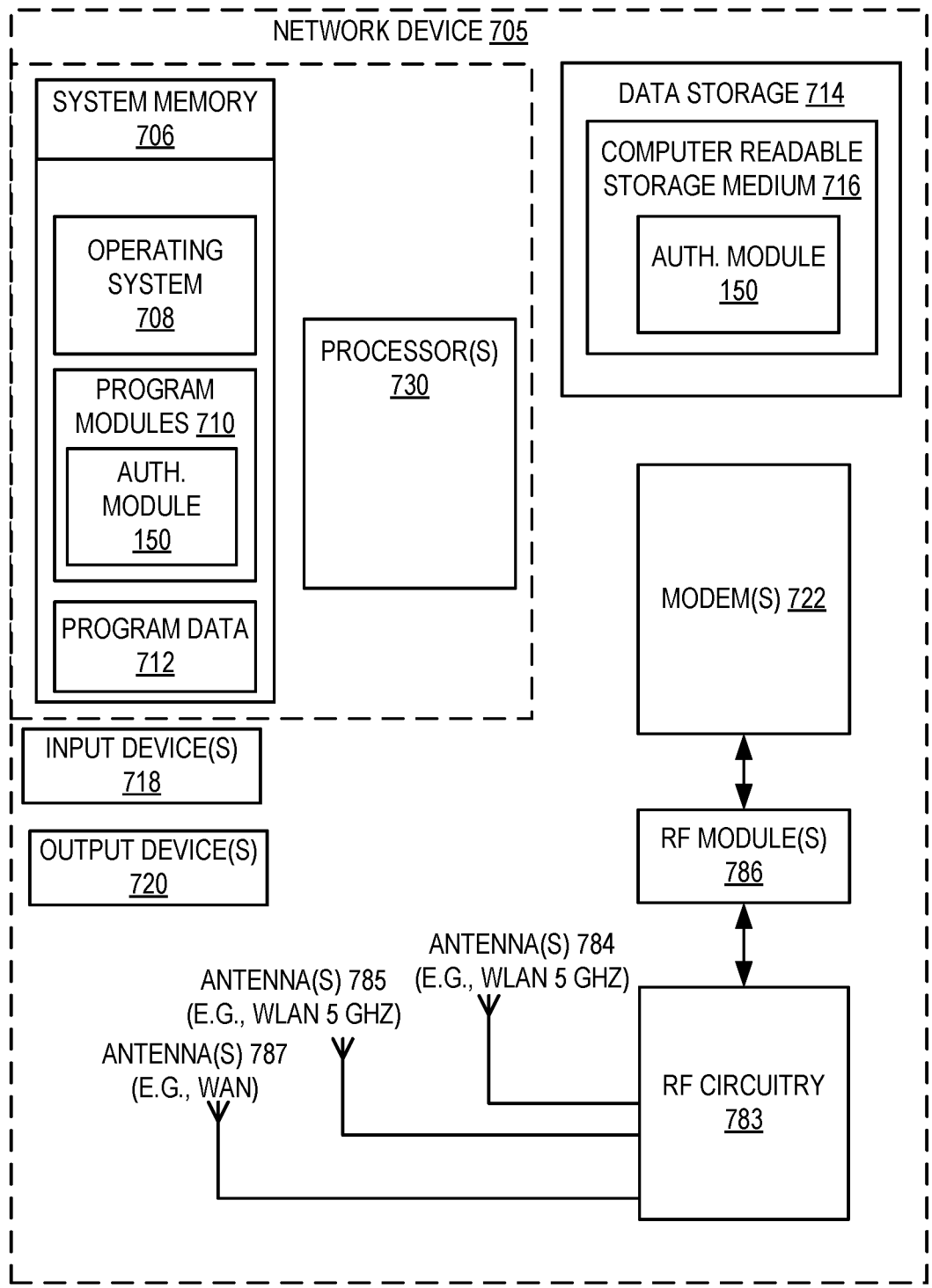
FIG. 7 is a block diagram of a network hardware device according to one embodiment.

FIG. 7 is a block diagram of a network hardware device 700 with an authentication module 150 according to one embodiment. The network hardware device 700 may correspond to one of wireless mesh devices 110 of FIG. 1. In another embodiment, the network hardware device 700 may correspond to the mesh device 600 of FIG. 6.

Alternatively, the network hardware device 700 may be other electronic devices, as described herein.

The network hardware device 700 includes one or more processor(s) 730, such as one or more CPUs, microcontrollers, field programmable gate arrays, or other types of processors. The network hardware device 700 also includes system memory 706, which may correspond to any combination of volatile and/or non-volatile storage mechanisms. The system memory 706 stores information that provides operating system component 708, various program modules 710, program data 712, and/or other components. The program modules 710 may include instructions of the authentication module 150. In one embodiment, the system memory 706 stores instructions of methods to control operation of the network hardware device 700. The network hardware device 700 performs functions by using the processor(s) 730 to execute instructions provided by the system memory 706.

The network hardware device 700 also includes a data storage device 714 that may be composed of one or more types of removable storage and/or one or more types of non-removable storage. The data storage device 714 includes a computer-readable storage medium 716 on which is stored one or more sets of instructions embodying any of the methodologies or functions described herein. Instructions for the program modules 710 may reside, completely or at least partially, within the computer-readable storage medium 716, system memory 706 and/or within the processor(s) 730 during execution thereof by the network hardware device 700, the system memory 706 and the processor(s) 730 also constituting computer-readable media. The network hardware device 700 may also include one or more input devices 718 (keyboard, mouse device, specialized selection keys, etc.) and one or more output devices 720 (displays, printers, audio output mechanisms, etc.).

The network hardware device 700 further includes a modem 722 to allow the network hardware device 700 to communicate via a wireless connection (e.g., such as provided by the wireless communication system) with other computing devices, such as remote computers, an item providing system, and so forth. The modem 722 can be connected to one or more RF modules 786. The RF modules 786 may be a WLAN module, a WAN module, a PAN module, a GPS module, or the like. The antenna structures (antenna(s) 784, 785, and 787) are coupled to the RF circuitry 783, which is coupled to the modem 722. The RF circuitry 783 may include radio front-end circuitry, antenna switching circuitry, impedance matching circuitry, or the like. The antennas 784 may be GPS antennas, NFC antennas, other WAN antennas, WLAN or PAN antennas, or the like. The modem 722 allows the network hardware device 700 to handle both voice and non-voice communications (such as communications for text messages, multimedia messages, media downloads, web browsing, etc.) with a wireless communication system. The modem 722 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc.

The modem 722 may generate signals and send these signals to antenna(s) 784 of a first type (e.g., WLAN 5 GHZ), antenna(s) 785 of a second type (e.g., WLAN 2.4 GHZ), and/or antenna(s) 787 of a third type (e.g., WAN), via RF circuitry 783, and RF module(s) 786 as descried herein. Antennas 784, 785, and 787 may be configured to transmit in different frequency bands and/or using different wireless communication protocols. The antennas 784, 785, and 787 may be directional, omnidirectional, or non-directional antennas. In addition to sending data, antennas 784, 785, and 787 may also receive data, which is sent to appropriate RF modules connected to the antennas. One of the antennas 784, 785, 787 may be any combination of the antenna structures described herein.

In one embodiment, the network hardware device 700 establishes a first connection using a first wireless communication protocol, and a second connection using a different wireless communication protocol. The first wireless connection and second wireless connection may be active concurrently, for example, if a network hardware device is receiving a media item from another network hardware device (e.g., a mini-POP node) via the first connection) and transferring a file to another user device (e.g., via the second connection) at the same time. Alternatively, the two connections may be active concurrently during wireless communications with multiple devices. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna structure and the second wireless connection is associated with a second antenna. In other embodiments, the first wireless connection may be associated with content distribution within mesh devices of the mesh network and the second wireless connection may be associated with serving a content file to a client consumption device, as described herein.

Though a modem 722 is shown to control transmission and reception via antenna (784, 785, 787), the network hardware device 700 may alternatively include multiple modems, each of which is configured to transmit/receive data via a different antenna and/or wireless transmission protocol.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs and magnetic-optical disks, read-only memories (ROMs), random access memories (RAMs), EPROMS, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A method comprising:
   receiving, by an authentication module executed by a processing device of a wireless mesh device in a wireless mesh network, a request to establish a Transport Layer Security (TLS) connection between a requesting device and the wireless mesh device, the request comprising a cryptographic certificate associated with the requesting device;
   authenticating, by the authentication module, the cryptographic certificate and establishing the TLS connection between the requesting device and the wireless mesh device;
   receiving, by the authentication module and from the requesting device via the TLS connection, a request directed to a service of a plurality of services provided by the wireless mesh device, where the request comprises the cryptographic certificate associated with the requesting device;
   identifying, by the authentication module, a root certificate used to cryptographically sign the cryptographic certificate, wherein the root certificate is associated with a role assigned to the requesting device;
   identifying, by the authentication module, an entry in a data store maintained by the wireless mesh device, the entry corresponding to service and indicating one or more roles that have permission to access the service; and
   responsive to determining that the role assigned to the requesting device is one of the one or more roles that have permission to access the service, authorizing, by the authentication module, the request to access the service.

2. The method of claim 1, further comprising:
   responsive to authorizing the request, forwarding, by the authentication module, the request to the service;
   receiving, by the authentication module and from the service, a response to the request; and
   sending, by the authentication module, the response to the requesting device via the TLS connection.

3. The method of claim 1, wherein the role assigned to the requesting device comprises one of a plurality of roles, wherein each of the plurality of roles has permission to access a respective subset of the plurality of services provided by the wireless mesh device, and wherein the role assigned to the requesting device comprises one of a wireless mesh device, an owner of the wireless mesh network, or an administrator of the wireless mesh network.

4. A wireless mesh device comprising:
   one or more processors; and
   memory to store computer-executable instructions that, if executed, cause the one or more processors to:
      receive, from a requesting device, a request to establish a secure communication session between a requesting device and the wireless mesh device in a wireless mesh network, the request comprising a client certificate associated with the requesting device;
      authenticate the client certificate and establish the secure communication session between the requesting device and the wireless mesh device;
      receive, from the requesting device via the secure communication session, a request directed to a service of a plurality of services provided by the wireless mesh device, where the request comprises the client certificate associated with the requesting device;
      identify a root certificate used to cryptographically sign the client certificate, wherein the root certificate is associated with a role assigned to the requesting device;
      identify role information associated with the requesting device and the client certificate; and
      responsive to determining that the role information indicates that the requesting device has permission to access the service, forward the request to the service.

5. The wireless mesh device of claim 4, wherein the role information comprises a role assigned to the requesting device, wherein the role assigned to the requesting device comprises one of a plurality of roles, each of the plurality of roles having access to a respective subset of the plurality of services provided by the wireless mesh device.

6. The wireless mesh device of claim 4, wherein the role assigned to the requesting device comprises one of a wireless mesh device, an owner of the wireless mesh network, or an administrator of the wireless mesh network.

7. The wireless mesh device of claim 4, wherein to determine that the role information indicates that the requesting device has permission to access the service, the instructions cause the one or more processors to identify, in a data store, an entry corresponding to the service, the entry indicating one or more roles that have permission to access the service.

8. The wireless mesh device of claim 4, wherein the instructions cause the one or more processors further to:
   receive, from the service, a response to the request; and
   send the response to the device via the secure communication session.

9. The wireless mesh device of claim 4, wherein the instructions cause the one or more processors further to:
   responsive to determining that the role information indicates that the requesting device does not have permission to access the service, deny the request.

10. The wireless mesh device of claim 4, wherein the secure communication session comprises a Transport Layer Security (TLS) connection.

11. The wireless mesh device of claim 4, wherein to authenticate the client certificate, the instructions cause the one or more processors to determine whether the client certificate matches a certificate stored in a data store.

12. A method comprising:
   receiving, from a requesting device, a request to establish a secure communication session between a requesting device and a wireless mesh device in a wireless mesh network, the request comprising a client certificate associated with the requesting device;
   authenticating the client certificate and establish the secure communication session between the requesting device and the wireless mesh device;
   receiving, from the requesting device via the secure communication session, a request directed to a service of a plurality of services provided by the wireless mesh device, where the request comprises the client certificate associated with the requesting device;

identifying a root certificate used to cryptographically sign the client certificate, wherein the root certificate is associated with a role assigned to the requesting device;

identifying role information associated with the requesting device and the client certificate; and responsive to determining that the role information indicates that the requesting device has permission to access the service, forwarding the request to the service.

13. The method of claim 12, wherein the role information comprises a role assigned to the requesting device.

14. The method of claim 13, wherein the role assigned to the requesting device comprises one of a plurality of roles, each of the plurality of roles having access to a respective subset of the plurality of services provided by the wireless mesh device.

15. The method of claim 12, wherein the role assigned to the requesting device comprises one of a wireless mesh device, an owner of the wireless mesh network, or an administrator of the wireless mesh network.

16. The method of claim 12, wherein determining that the role information indicates that the requesting device has permission to access the service comprises identifying, in a data store, an entry corresponding to the service, the entry indicating one or more roles that have permission to access the service.

17. The method of claim 12, further comprising:

receiving, from the service, a response to the request; and sending the response to the device via the secure communication session.

18. The method of claim 12, further comprising:

responsive to determining that the role information indicates that the requesting device does not have permission to access the service, denying the request.

19. The method of claim 12, wherein the secure communication session comprises a Transport Layer Security (TLS) connection.

20. The method of claim 12, wherein authenticating the client certificate comprises determining whether the client certificate matches a certificate stored in a data store.

\* \* \* \* \*